United States Patent [19]
Van de Kop

[11] 4,063,244
[45] Dec. 13, 1977

[54] RECEIVER/TIMING APPARATUS FOR A SINGLE FREQUENCY, TIME-SHARED POSITIONING SYSTEM

[75] Inventor: Franz Van de Kop, Baton Rouge, La.

[73] Assignee: Odom Offshore Surveys, Inc., Baton Rouge, La.

[21] Appl. No.: 713,047

[22] Filed: Aug. 9, 1976

Related U.S. Application Data

[63] Continuation-in-part of Ser. No. 617,023, Sept. 26, 1975, abandoned.

[51] Int. Cl.$^2$ ............................................. G01S 1/30
[52] U.S. Cl. ............................... 343/105 R; 178/69.1
[58] Field of Search ................... 343/105 R; 178/69.5

[56] References Cited
U.S. PATENT DOCUMENTS

| | | | |
|---|---|---|---|
| 3,889,265 | 6/1975 | Tanaka et al. | 343/105 R |
| 3,900,876 | 8/1975 | Tsukada et al. | 343/105 R |
| 3,936,763 | 2/1976 | Palmer | 329/104 |

*Primary Examiner*—Maynard R. Wilbur
*Assistant Examiner*—Richard E. Berger
*Attorney, Agent, or Firm*—Arnold, White & Durkee

[57] ABSTRACT

An improved receiver/timing apparatus is disclosed for use in a single frequency, time-shared, continuous wave, phase-comparison positioning system wherein a trigger signal is transmitted from a master station and wherein pattern frequency signals are transmitted from the master and a plurality of slave stations. The improved receiver/timing apparatus comprises a trigger processor and a timing generator. After acceptable good trigger transmissions have been received for a predetermined number of successive trigger intervals, subsequent trigger transmissions from the master transmitting station are sampled only during a precise interval which is dictated by a timing generator. Also, the timing generator is "locked in" at that time, and spurious electrical transmissions can not reinitialize the timing generator and proper phase comparison is, therefore, maintained. The timing generator also generates precise timing signals, the occurrence of which dictate the intervals during which pattern frequency transmissions from the master and slave stations may be sampled. The improved receiver/timing apparatus further comprises a discriminator which outputs signals to drive pattern digitizer electronics. The phase of each signal which used to drive the pattern digitizer is compared to the phase of the derived IF signal from the respective pattern frequency signal and is corrected if out of phase. Correction of the phase of the signals driving the pattern digitizer is limited by an error excursion limiter. This limiting technique prevents spurious transmissions received during master and slave stations pattern frequency transmission times from adversely affecting the information stored in the pattern digitizer.

9 Claims, 9 Drawing Figures

FIG.1A
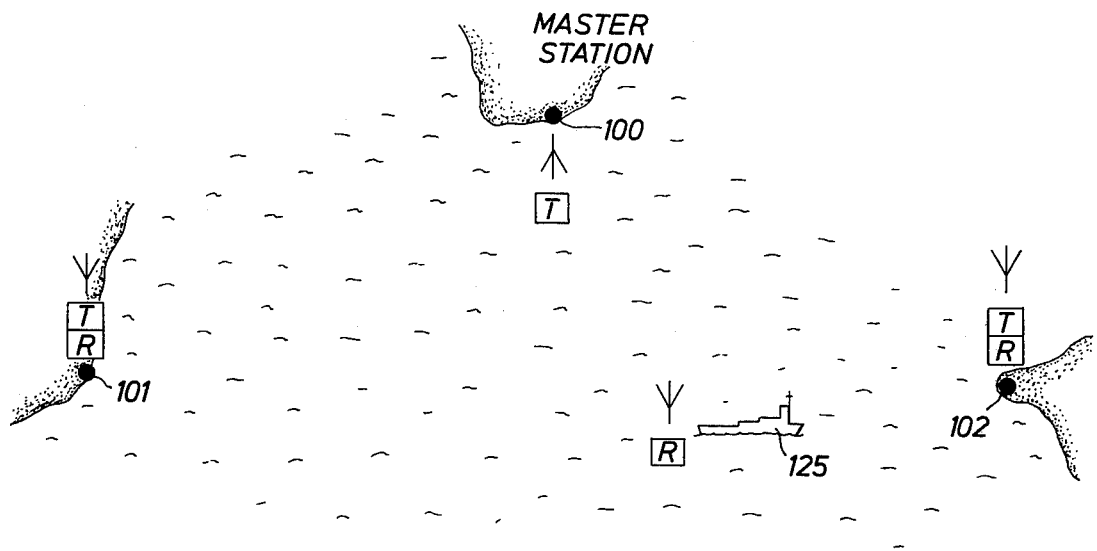
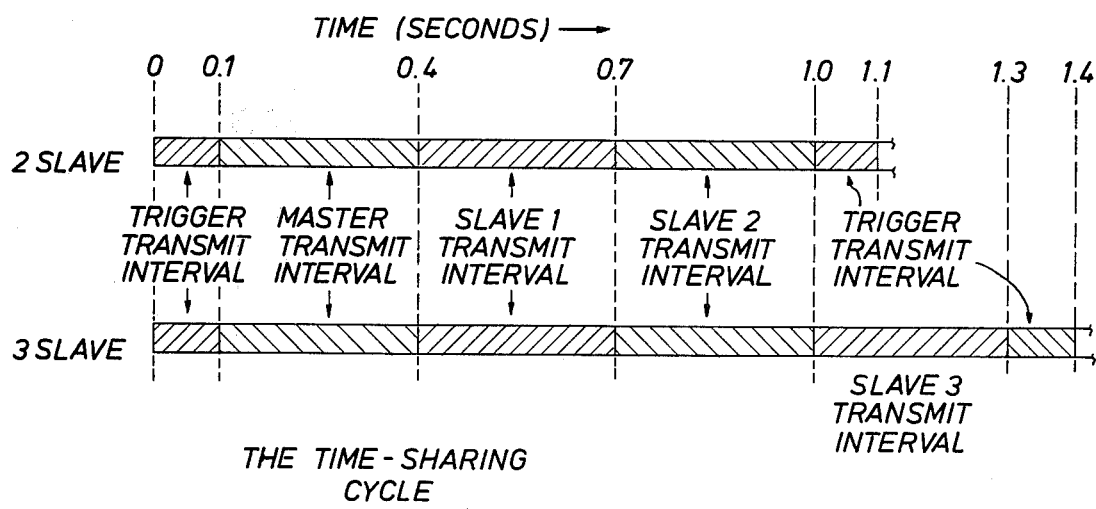
FIG.1B

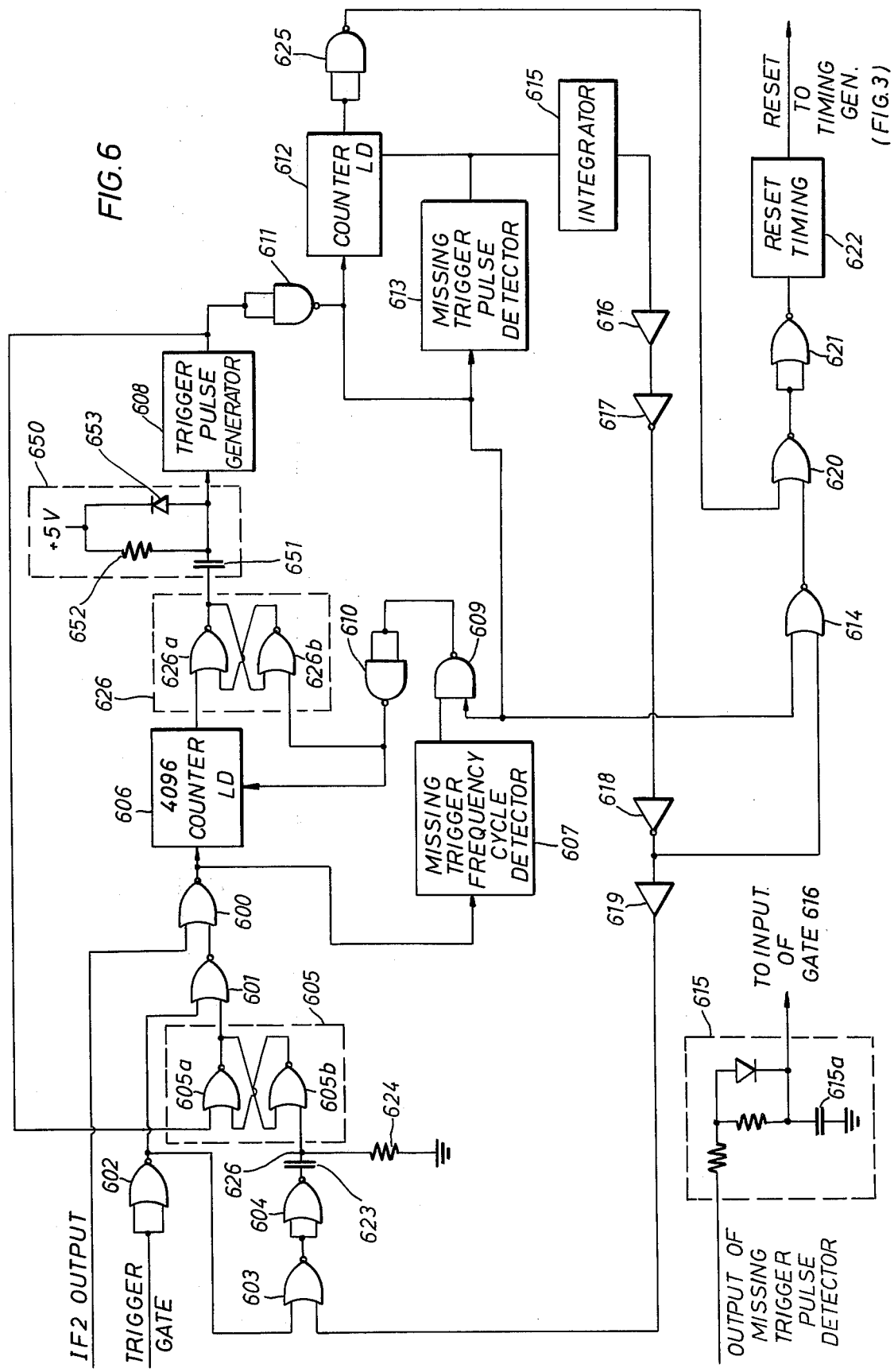

RECEIVER/TIMING APPARATUS FOR A SINGLE FREQUENCY, TIME-SHARED POSITIONING SYSTEM

CROSS REFERENCE TO RELATED APPLICATIONS

This application is a continuation-in-part of U.S. Pat. App. Ser. No. 617,023, filed Sept. 26, 1975, now abandoned.

BACKGROUND OF THE INVENTION

1. Field of the Invention

The apparatus of the present invention relates to improved receiver/timing circuitry for utilization in single frequency, time-shared, continuous wave, phase-comparison positioning systems.

2. Description of the Prior Art

Single frequency, time-shared, continuous wave, phase-comparison positioning systems are utilized extensively today primarily as a means for determining the location of a vessel at sea. The location of the vessel is extremely important when, for example, it is conducting seismic operations. The seismic records that are gathered at sea must be correlated with the location at which they were gathered so that later drilling operations may be commenced in the proper location.

A typical single frequency, time-shared, continuous wave, phase-comparison positioning system is shown in FIG. 1. It comprises a master station and two slave stations which transmit continuous wave signals for fixed intervals, in fixed sequence, and at a fixed repetition rate. The repetition rate is usually chosen as one second, with the master station transmitting interval the first 400 milliseconds and with each slave station transmission interval being 300 milliseconds. During the first 100 milliseconds of the master station transmitting interval, the master station transmits a trigger signal which is utilized by the receivers in the slave stations and the vessel at sea to lock their timing circuitry to the master. During the last 900 milliseconds of a one second period, the master and slave stations transmit pattern frequency signals. The pattern digitizer circuitry utilizes the pattern frequency signals to determine the location of the vessel.

The frequency of transmission that is used by the master and two slave stations will, of course, have a given wavelength. The receiver on the vessel at sea compares the phase difference between the master station pattern frequency transmission and the first slave station pattern frequency transmission and the phase difference between the master station pattern frequency transmission and the second slave station pattern frequency transmission to accurately determine its position at sea. This phase difference is calculated by the pattern digitizer which outputs a visual display of the location of the vessel.

Single frequency, time-shared, continuous wave, phase-comparison positioning systems of the prior art have depended completely upon the reception of a proper trigger signal from the master station to initiate circuitry for the phase-comparison described above. In ideal weather conditions, the positioning systems of the prior art have worked relatively well, but their performance has been susceptible to being adversely affected.

Adverse weather conditions is an example of an instance in which the performance of the positioning systems of the prior art may be adversely affected. During an electrical storm, for example, electronic signals will be generated by lightning, and the electrical signals generated by this lightning may be detected by the receiver on the vessel as the trigger signal from the master. A trigger so detected is a false trigger, but systems of the prior art could not discern false triggers from good triggers. Consequently, the false trigger reinitialized timing circuitry and phase-comparison would be made between pattern frequency signals that should not be compared. The pattern digitizer electronics on the vessel would change rapidly when the erroneous comparison was made, and the correct position of the vessel at sea would be lost. Consequently, further data could not be gathered since the data would have no location with which to be correlated. The vessel would have to return to a location (usually the shoreline) whose coordinates are known to obtain accurate location information to be entered into the pattern digitizer. After returning and obtaining its correct coordinate positions, it would return to the location where operations were being previously conducted and then resume operations. If the vessel were, for example, operating at a distance of 100 miles offshore, it is apparent that a considerable period of time is lost when the vessel must travel 200 miles before meaningful operations can begin again.

SUMMARY OF THE INVENTION

An improved receiver/timing apparatus is provided for use in a single frequency, time-shared, continuous wave, phase-comparison positioning system. In such a positioning system there exists a master station which transmits continuous wave trigger signal for a fixed interval of time. Continuous wave pattern frequency signals for phase comparison are then transmitted in fixed sequence first from the master station and then from a plurality of slave stations. The pattern frequency signals are also generated for fixed intervals of time, and the trigger signal and pattern frequency signals have a fixed repetition rate.

The improved receiver/timing apparatus of the present invention comprises as a first element a timing means which generates a set of sequentially active signals corresponding in sequence and active duration to the trigger and pattern frequency sequence and transmission intervals, respectively. Each signal generated by the timing means has a repetition rate which is identical to the repetition rate of the transmitted trigger and pattern frequency transmission interval with which it corresponds. The improved receiver/timing apparatus of the present invention further comprises means for receiving the transmitted continuous wave signals, and means in association with said receiving means for deriving an IF signal from the received trigger signal. Finally, a trigger processor is provided which comprises a flip-flop which is enabled by a signal from the timing means. The enabled flip-flop permits the trigger processor to receive the derived IF signal. The trigger processor further comprises means for determining if a predetermined portion of the derived IF signal meets acceptable frequency criteria. The trigger processor additionally comprises a trigger pulse generator which is activated at the end of the trigger interval if the predetermined portion of the derived IF signal meets acceptable frequency criteria. Finally, reset timing means are provided which are responsive to the signal generated by trigger pulse generator for resetting the timing means to a state corresponding to the beginning of the pattern frequency transmission intervals.

In one embodiment of the improved receiver/timing apparatus of the present invention, the trigger processor first comprises a programmable counter. The contents of the programmable counter are intially set to a predetermined programmed value, and the programmable counter is utilized to generate one signal per trigger interval after counting a number of pulses of the derived IF signal equal to the programmed contents of the counter. As the IF signal pulses are counted by the counter means, means are provided for checking the width of each pulse to insure that the derived IF signal meet acceptable frequency criteria. Means are also provided for restoring the contents of the programmable counter to the initial programmed value whenever the derived IF signal does not meet acceptable frequency criteria. The trigger pulse generator is responsive to the signal generated by the counter means for generating a signal at its output to activate the reset timing means. The reset timing means generates a signal to reset the timing means to a state corresponding to the beginning of the pattern frequency transmission intervals whenever a trigger signal meeting acceptable frequency criteria has been detected.

A preferred embodiment of the trigger processor additionally comprises means for detecting when good trigger signals have been received from a predetermined number of successive trigger intervals. Inhibiting means are provided for preventing the signal generated by the trigger pulse generator from resetting the timing means after good trigger signals have been received for the predetermined number of succssive trigger intervals.

The improved receiver/timing apparatus of the present invention may also further comprise means for deriving a second IF signal from the pattern frequency signals transmitted by the master and slave stations. In such a case, the timing means further comprises means for generating a set of sample signals, wherein the set of sample signals are active during respective portions of the pattern frequency transmission intervals. Means are provided for generating a plurality of signals for use by a pattern digitizer, and a discriminator responsive to the two set of signals generated by the timing means compares the phase relationship of the IF signal derived from each transmitted pattern frequency signal to the respective pattern digitizer signal which is provided in the embodiment of apparatus of the present invention. Means are further provided for adjusting the phase of the respective pattern digitizer signal to be in phase with the received derived IF signal. The adjustment means includes error excursion limiting means for limiting the amount of phase adjustment which may be made to each pattern digitizer signal during a pattern frequency transmission interval.

BRIEF DESCRIPTION OF THE DRAWINGS

In the accompanying drawings:

FIG. 1a is a pictorial illustration of the arrangement of a typical single frequency, time-shared, continuous wave, phase-comparison positioning system;

FIG. 1b is a timing diagram which illustrates the portion of a one second interval in which the master and slave stations shown in FIG. 1A transmit their respective positioning system signals;

FIG. 6 is a logic diagram of an embodiment of the trigger processor of the timing generator which is shown in FIG. 2;

FIG. 7b is an electrical schematic in block diagram form of the sample and hold circuit which is used in the embodiment of the discriminator shown in FIG. 7a.

DESCRIPTION OF THE PREFERRED EMBODIMENT

Figure 2:
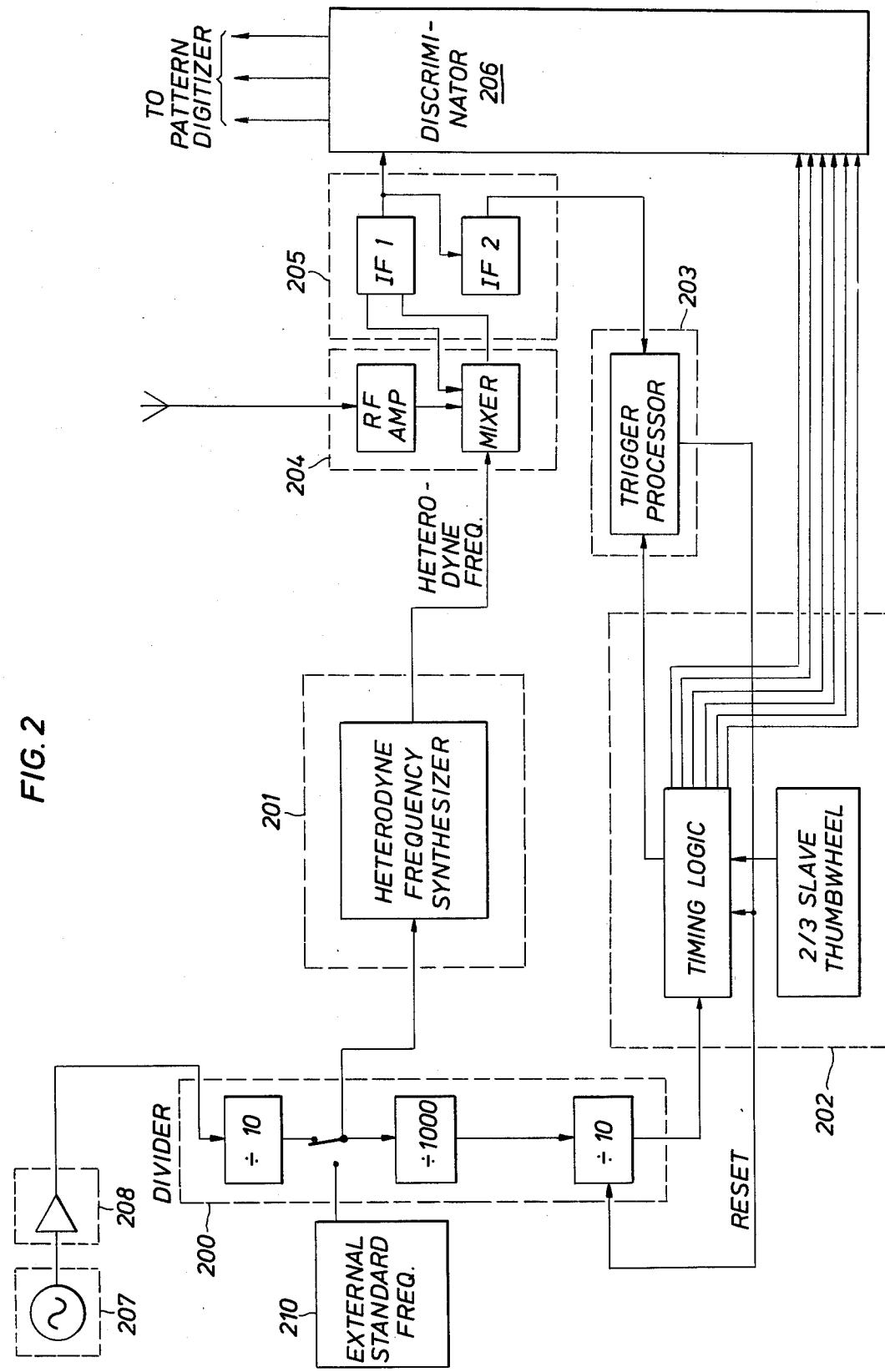
FIG. 2 is an electrical schematic in block diagram form of an embodiment of the receiver/timing apparatus of the present invention.

It will be appreciated that the present invention can take many forms and embodiments. One embodiment of the invention will be herein described so as to give an understanding of the invention. It is not intended, however, that the embodiment of the invention herein described should in any way limit the invention.

Before the receiver/timing apparatus of the present invention is described. it is appropriate to include a brief discussion of the manner in which single frequency, time-shared positioning systems traditionally operate. With reference now to FIG. 1, there is shown a typical arrangement of a single frequency, time-shared positioning system. This system includes a master transmitting station 100, a first slave receiver/transmitting station 101, and a second slave receiver/transmitting station 102.

With reference to both FIGS. 1a and 1b, once every second master transmitting station 100 will first transmit a continuous wave (CW) trigger signal for approximately 100 milliseconds. The master station 100 will then transmit a CW pattern frequency signal during the next 300 milliseconds of a given one second time interval. Each of these transmissions from master station 100 are received by slave stations 101 and 102 and by the receiver on vessel 125. Slave station 101 then transmits a CW pattern frequency signal for approximately the next 300 milliseconds of a one second time interval. The signal generated by slave 101 is received by slave station 102 and the receiver on vessel 125. During the last 300 millisecond period of a given one second interval, slave station 102 generates a CW pattern frequency signal. This signal is received by slave station 101 and the receiver on vessel 125.

Vessel 125 utilizes the phase difference between the pattern frequency signals received from master station 100 and slave stations 101 and 102 to update its position in the ocean as it travels along. The position of vessel 125 is extremely important when vessel 125 is conducting marine seismic operations. The reason for this is that when the seismic records which are gathered by vessel 125 are later analyzed, it must be known with certainty the area in which the data was recorded.

The CW trigger signal transmitted by master station 100 during the first 100 milliseconds of a given one second period indicates the beginning of a period of transmission. The frequency of the CW trigger signal differs from the frequency of the CW pattern frequency signals generated during the last 900 milliseconds of a given one second period usually by 60 Hz. This technique permits the company operating the positioning system to only be required to obtain a license for one frequency from the FCC.

The following description will focus primarily on the receiver/timing apparatus according to the present invention which will be utilized on vessel 125. It will be realized, however, that the same apparatus may be utilized at master station 100 and slave stations 101 and 102.

With reference now to FIG. 2, there is shown an electrical schematic in block diagram form of one embodiment of the receiver/timing apparatus of the present invention. It comprises divider 200, heterodyne frequency generator 201, timing generator 202, trigger processor 203, RF demodulator 204, IF amplifier/filter circuitry 205, discriminator 206, control oscillator 207, and analog-to-TTL converter 208.

The frequency of control oscillator 207 is divided by divider 200 to a suitable frequency for use by heterodyne frequency generator 201. Heterodyne frequency generator 201 generates a signal at its output which has a frequency which will be referred to as the heterodyne frequency. The output of heterodyne frequency generator 201 is coupled to one input of RF demodulator 204. Antenna 211 receives the CW trigger and pattern frequency signals generated by master station 100 and slave stations 101 and 102 (FIG. 1), and these signals are coupled to a second input of RF demodulator 204. A signal having an intermediate frequency (IF) emerges at the output of RF demodulator 204 and is coupled to the inputs of IF amplifier/filter circuitry 205.

IF amplifier/filter circuitry 205 comprises two filters, indicated in FIG. 2 as IF 1 and IF 2. The output of RF demodulator 204 is coupled to the input of filter IF 1. Filter IF 1 is designed to amplify and pass IF signals derived from the CW trigger and pattern frequency transmissions. Filter IF 1 also comprises circuitry to provide automatic gain control to RF demodulator 204. The output of filter IF 1 is coupled to the input of filter IF 2. Filter IF 2 is designed to amplify and pass only those IF signals derived from the CW trigger signal transmitted from the master station 100 (FIG. 1), and it will be recalled that the frequency of the trigger signal normally differs from the frequency of the pattern frequency signals by 60 Hz. The signal emerging from filter IF 1 is also coupled to one input of discriminator 206, and the signal emerging from filter IF 2 is coupled to one input of trigger processor 203.

Still referring to FIG. 2, the frequency of the signal emerging from control oscillator 207 is further divided to obtain a signal of a suitable frequency for use by timing generator 202. Timing generator 202 comprises means for generating a first set of signals which are indicative of the fact that the master station, the first slave station, and the second slave station are transmitting their CW pattern frequency signals. Timing generator 202 also comprises means for generating a second set of signals which are sample pulses which are used to sample the IF signals which are derived from the CW pattern frequency signals transmitted by the master and slave stations. These first and second sets of signals from timing generator 202 are coupled as inputs to discriminator 206.

Timing generator 202 further comprises means for generating a trigger gate signal which is active during the period of time that master station 100 is transmitting the trigger signal. The trigger gate signal is coupled to one input of trigger processor 203.

Discriminator 206 provides signals to a pattern digitizer (not shown). The signals provided have the same frequency and are adjusted to be in phase with the IF frequencies derived from the CW pattern frequency signals that are received during the respective master, slave 1 and slave 2 transmission periods. These signals are utilized by the pattern digitizer to accurately maintain the location of the vessel in the ocean.

The single frequency, time-shared positioning systems of the prior art were completely dependent upon the proper reception and detection of the trigger signal (FIG. 1) from master station 100. As discussed above, spurious electrical interference, resulting for example, from electrical storm, would cause receiver apparatus heretofore used to believe that a trigger was being transmitted by the master. The receipt of this false trigger would initiate a phase-comparison between signals that should not be compared. Consequently, the location of the vessel stored in the pattern digitizer slewed rapidly, thereby causing the correct location of the ship at sea to be destroyed. Any data which has been collected became meaningless since it could not be correlated with the location from which it was gathered. Trigger processor 203 has been designed to remove the dependence of the positioning system upon the receipt of a good trigger signal every second and to prevent false triggers from reinitializing the phase-comparison process.

With reference still to FIG. 2, trigger processor 203 prevents the IF signal derived from the trigger transmission from directly resetting timing generator 202 to a state corresponding to the beginning of the pattern frequency transmission intervals. Trigger processor 203 provides apparatus: (1) to determine when a suitable number of good triggers have been received; and (2) when this suitable number of good trigger pulses has been received, to sample the IF signal derived from the trigger signal only at specified interval; and (3) to lock the phase-comparison process to the timing generator 202. Spurious electrical transmissions are prevented from reinitializing the timing sequence of timing generator 202. If the spurious electrical transmission continues to exist during the master or slave transmission times (FIG. 1A), then discriminator 206 is designed to limit the amount of phase correction that can be made to the signals provided to the pattern digitizer.

Figure 3:
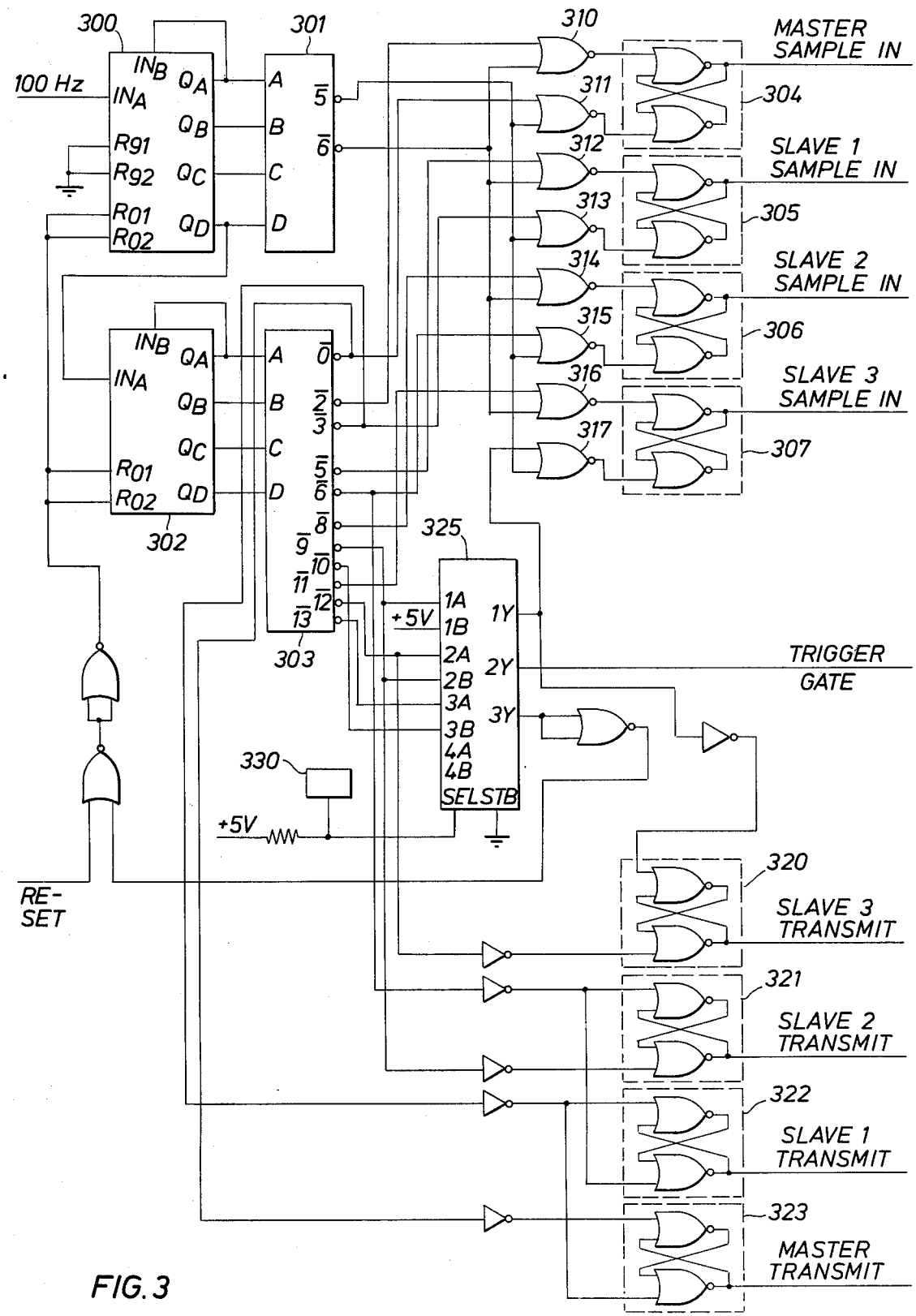
FIG. 3 is a detailed logic diagram which illustrates an embodiment of the timing generator of FIG. 2.

Referring now to FIG. 3, there is shown a detailed schematic diagram of timing generator 202 (FIG. 2) which is utilized in one embodiment of the present invention. As aforementioned, the frequency of the signal emerging from control oscillator 207 (FIG. 2) is divided a suitable number of times by divider 200 for use by timing generator 202. In one embodiment of the present invention, the frequency of control oscillator 207 is 10 MHz, and this frequency is divided by divider 200 by a factor of 100,000 to produce a signal having a frequency of 100 Hz for use by timing generator 202.

Still referring to FIG. 3, the 100 Hz signal emerging from divider 200 is coupled to the count input of counter 300. Counter 300 is preferably a divide by ten counter, which may, for example, be a 7490 such as manufactured by Texas Instruments. The frequency of the signal emerging at the $Q_d$ output of counter 300 is, therefore 1/10th of the input frequency, and in the embodiment of timing generator 202 shown in FIG. 3, this signal has a frequency of 10 Hz.

Still referring to FIG. 3, the outputs, $Q_a$-$Q_d$, are coupled to the inputs of decoder 301. Decoder 301 is preferably a 7442 such as manufactured by Texas Instruments, Inc. Since counter 300 will count sequentially from 0 to 9 every 100 milliseconds, it will be apparent to those skilled in the art that the various outputs of decoder 301 will be active for 10 milliseconds during any given 100 millisecond period. The outputs of decoder 301 which are utilized in the embodiment of the timing generator 201 shown in FIG. 3 are outputs 5 and 6. The utilization of these signals will be described in more detail below.

Still referring to FIG. 3, the signal emerging at the $Q_d$ output of counter 300 is coupled to the count input of counter 302. In the embodiment of the timing generator 202 shown in FIG. 3, counter 302 is preferably a 4-bit binary counter which may, for example, be a 7493 such as manufactured by Texas Instruments, Inc. Those skilled in the art will realize, however, that there are several 4-bit binary counters which may be utilized.

Since the frequency of the signal emerging from the $Q_d$ output of counter 300 is 10 Hz in the embodiment shown in FIG. 3, the output of counter 302 will be incremented once every 100 milliseconds. It is, therefore, possible to implement the one second time period of the CW trigger and pattern frequency transmissions from the master and slave stations by decoding the outputs of counter 302.

Still referring to FIG. 3, the outputs of counter 302 are coupled as inputs to decoder 303. Decoder 303 is preferably a four-line-to-sixteen-line decoder and may, for example, be a 74154 such as manufactured by Texas Instruments, Inc. The various outputs of decoder 303 will become active when the binary value of the outputs of counter 302 correspond to the respective decimal values of the outputs of decoder 303. As aforementioned, each of the respective outputs of decoder 303 will be active for a period of 100 milliseconds.

The outputs of decoders 301 and 303 are utilized to generate the signals designated as MASTER SAMPLE IN, SLAVE 1 SAMPLE IN, SLAVE 2 SAMPLE IN, and SLAVE 3 SAMPLE IN. Each of the forgoing signals are generated at the outputs of flip-flops 304 - 307, respectively.

In the embodiment of timing generator 202 shown in FIG. 3, flip-flops 304-307 comprise cross-coupled NOR gates as shown. These cross-coupled NOR gates are in effect R-S flip-flops, and it will be apparent to those skilled in the art that many devices could be used to implement the logic function at the outputs of flip-flops 304-307. For example, flip-flops 304-307 may comprise cross-coupled NAND gates if the logical polarity of the signal to set and reset the flip-flops were inverted. Alternately, flip-flops 304-307 may comprise flip-flops, such as a 7474 with the set and reset inputs to flip-flops 304-307 being coupled to the preset and clear of that device. It will be apparent, however, that the logical inverse of the set and reset signals would be required if a 7474 were used. In the embodiment of timing generator 202 shown in FIG. 3, the NOR gates which are used to implement flip-flops 304-307 are preferably 7402's such as manufactured by Texas Instruments, Inc.

Figure 4:
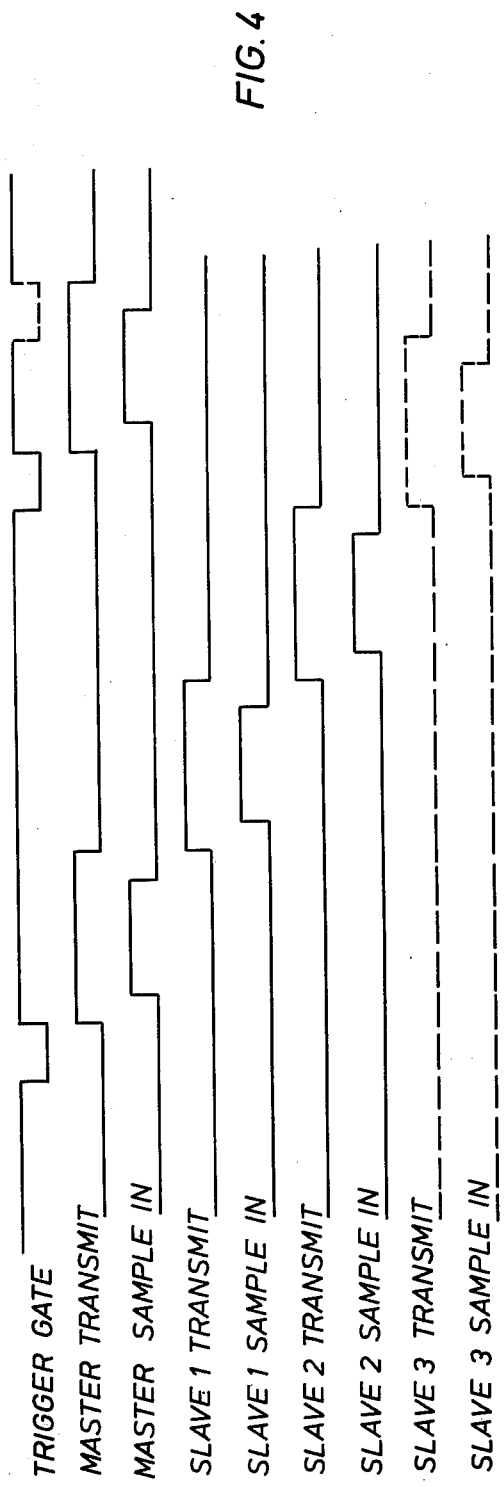
FIG. 4 is a timing diagram which illustrates the active portions of the signals generated by the embodiment of the timing generator which is shown in FIG. 3.

Still referring to FIG. 3, flip-flops 304-307 are set and reset by the signals emerging at the outputs of NOR gates 310-317. The timing diagram in FIG. 4 illustrates the active states of each of the signals MASTER SAMPLE IN, SLAVE 1 SAMPLE IN, SLAVE 2 SAMPLE IN, and SLAVE 3 SAMPLE IN.

Still referring to FIG. 3, the embodiment of timing generator 202 also generates the signals indicated as MASTER XMIT, SLAVE 1 XMIT, SLAVE 2 XMIT, and SLAVE 3 XMIT. These signals are generated at the outputs of flip-flops 320-322, respectively, and in the embodiment of the timing generator shown, flip-flops 320-322 are again cross-coupled NOR gates. The NOR gates utilized to implement flip-flops 320-322 are preferably 7402's such as manufactured by Texas Instruments, Inc., and it will be appreciated by those skilled in the art that the above discussion with respect to the implementation of flip-flops 304—307 is equally applicable to the implementation of flip-flops 320-322. The timing diagram in FIG. 4 illustrates the active states of each of the "XMIT" signals.

It will be noted from the schematic diagram of FIG. 3 that timing generator 202 provides sample pulses and XMIT pulses for up to three slave stations. As indicated in FIG. 1, a single frequency, time-shared positioning system may be configured to have only one master station and two slave stations. In this instance, the signals emerging at the outputs of flip-flops 307 and 322 will not become active.

Still referring to FIG. 3, if there are only two slave stations, then the output of flip-flop 307 is prevented from becoming active by data selector 325. The select input to data selector 325 is coupled to thumbwheel switch 330. Thumbwheel switch 330 either generates a high logic level or a low logic level on the select input of data selector 325. If a low logic level appears at the select input of 325, then only two slave stations are being utilized and flip-flops 307 and 322 will not be set. If, however, three slave stations are being utilized, then a high logic level appears at the select input and allows the decoded count 9 out of decoder 303 to set flip-flop 307 when count 5 of decoder 301 is active.

If only two selective stations are utilized in the single frequency, time-shared, continuous wave, phase-comparison positioning system, then the second output (2Y) of data selector 325 generates the signal indicated as TRIGGER GATE at the beginning of decoded count 9 out of decoder 303. The active state of the TRIGGER GATE signal indicates that the CW trigger signal from the master should be received during the next 100 milliseconds. Following the expiration of the TRIGGER GATE signal, counter 303 will be incremented to the count of 10 which is utilized to reset counters 300 and 302 to an initial all zero position and the counting cycle will repeat itself.

If, however, three slave stations were utilized in the single frequency, time-shared, continuous wave, phase-comparison positioning system, the TRIGGER GATE signal would not be generated until decoded count 12 from decoder 303 and the resetting of counters 300 and 302 would occur on decoded count 13. It will be noted that when counter 302 is reset to all zeros, decoder 303 immediately decodes a zero at its zero decode output and that the signal MASTER XMIT emerging at the output of flip-flop 322 immediately assumes a high state. Fifty milliseconds later the signal MASTER SAMPLE IN, which emerges at the output of flip-flop 304, becomes active and the cycle repeats itself.

With reference now to FIG. 4, as aforementioned, there is shown a detailed timing diagram of the active states of each of the signals generated by the embodiment of timing generator 202 shown in FIG. 3. Those skilled in the art will appreciate that the "XMIT" signals are active during the period of time that the master and slave stations are transmitting the CW pattern frequency signals.

Figure 5:
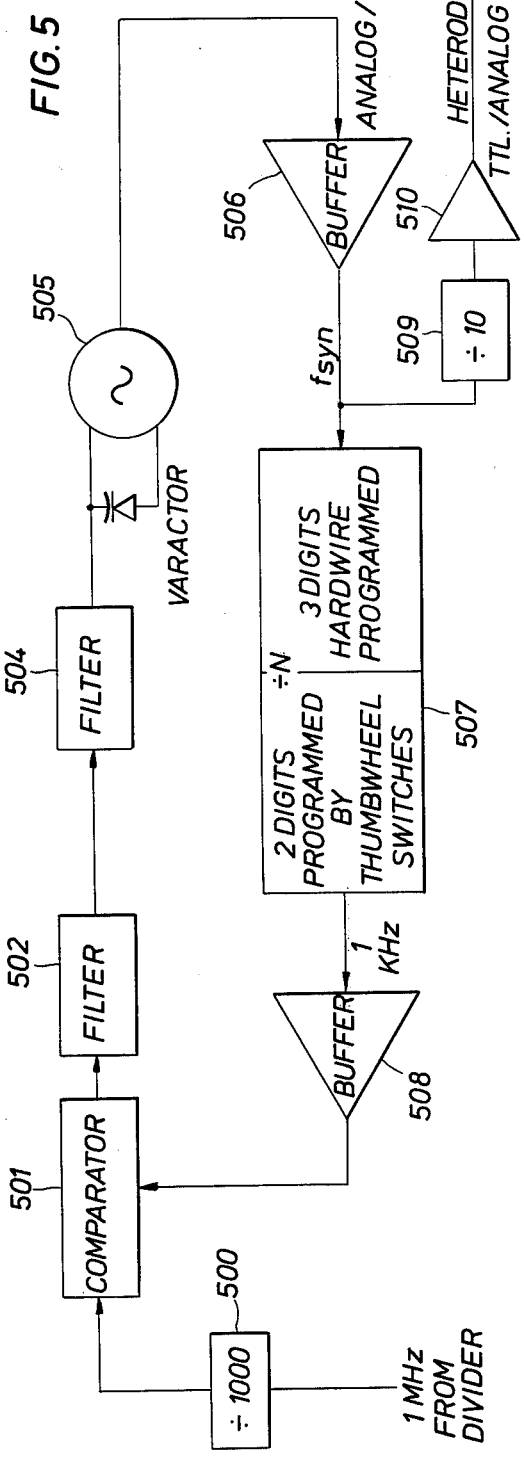
FIG. 5 is an electrical schematic in block diagram form of a radio frequency synthesizer.

With reference now to FIG. 5, there is shown an embodiment of heterodyne frequency generator 201 (FIG. 2) which is utilized in an embodiment of the present invention. It comprises divider 500, phase comparator 501, filter 502, filter 504, oscillator 505, buffer 506, frequency selector 507, buffer 508, divider 509 and TTL/analog converter 510, all connected as shown. As aforementioned, divider 200 (FIG. 2) generates a signal which has a frequency which is suitable for use by heterodyne frequency generator 201 and which is coupled to the inputs of heterodyne frequency generator 201. In the embodiment shown, the frequency of the signal is 1M Hz, and this signal is coupled to the input of buffer 500.

Referring again to FIG. 2, it will be appreciated by those skilled in the art that the frequency of the signal entering RF demodulator 204 from antenna 211 will be mixed with the frequency emerging from heterodyne frequency generator 201. This mixing results in four signals of different frequencies being generated. The frequencies of the signals will be the heterodyne frequency, the frequency of the signal received at the antenna, the sum of the received frequency and the heterodyne frequency, and the difference of the heterodyne frequency and the received frequency. The signal having the frequency equal to the difference between the heterodyne frequency and the received frequency is usually used as the intermediate (IF frequency). The desired intermediate frequency to be obtained out of the RF demodulator will determine the heterodyne frequency.

An intermediate frequency of 100,000 Hz has been chosen in the embodiment of the receiver/timing apparatus shown in FIG. 2. It will be apparent, however, that another intermediate frequency could be utilized.

Since the frequency of the signal emerging from RF demodulator 204 is chosen at 100,000 Hz, it is apparent that the heterodyne frequency emerging from heterodyne frequency generator 201 must be a frequency which is 100,000 Hz greater than the frequency of the signal received on antenna 211. An example will best explain the operation of an embodiment of the heterodyne frequency generator 201.

Suppose, for example, that the pattern frequency transmission which is utilized by the master and slave stations is 1,747,000 Hz. In order to obtain an IF frequency of 100,000 Hz, the heterodyne frequency must be 1,847,000, and heterodyne frequency generator 201 must synthesize a signal having this frequency.

The synthesization of the heterodyne frequency will be explained by reference to FIG. 5. The frequency of oscillation of oscillator 505 is chosen to be approximately ten times the desired heterodyne frequency. In the example given, oscillator 505 would have an oscillation frequency of approximately 18 MHz. Furthermore, the frequency of oscillator 505 must be adjustable. The signal emerging from oscillator 505 is coupled to the input of analog to TTL buffer 506, and the output of analog to TTL buffer 506 is coupled to one input of frequency selector 507. Frequency selector 507 comprises a plurality of programmable counters which divide the frequency of the signal emerging from oscillator 505 by a divisor which is programmed into frequency selector 507.

A signal having a frequency equal to the oscillator 505 frequency divided by the programmed divisor frequency will emerge from frequency selector 507 and is coupled to the input of buffer 508. The output of buffer 508 is coupled as one input to phase comparator 501, and the other inut to phase comparator 501 is coupled to the output of divider 500. A signal having a frequency of 1 MHz is coupled to the input of divider 500, and divider 500 divides the 1 MHz frequency by 1000.

The difference in phase between the two signals presented as inputs to phase comparator 501 generates a dc error voltage at the output of phase comparator 501. This error voltage may be corrupted by 1 KHz noise, and the output of phase comparator 501 is filtered by filters 502 and 504 to remove this noise. The filtered error voltage is coupled to the input of oscillator 505 and either increases or decreases the frequency of oscillation of oscillator 505. The increase or decrease in the frequency of oscillation of oscillator 505 continues until the difference between the signals presented as inputs to phase comparator 501 is negligible. At this time the frequency of the signal, $f_{syn}$, emerging at the output of buffer 506 will be 1,000 times the divisor which was initially programmed into frequency selector 507.

The signal emerging from buffer 506 is coupled to the input of counter 509, which is preferably a divide by ten counter. The frequency of the signal at the output of counter 509 will be the heterodyne frequency, and the output of counter 509 is coupled to the input of TTL to analog buffer 510. The signal at the output of TTL to analog buffer 510 has a frequency equal to the heterodyne frequency and is coupled to the input of RF demodulator 204 (FIG. 2).

Since the desired heterodyne frequency was 1,847,000 in the example given above, the frequency of signal $f_{syn}$ is 18,470,000 Hz when the phase difference between the input signals to phase comparator 501 is negligible. Since the frequency of signal $f_{syn}$ is 1000 times the divisor programmed into frequency selector 507, the divisor must be 18470 in the example given.

It will be appreciated that the programming of the divisor into frequency selector 507 may be accomplished in a variety of ways. In the preferred embodiment of frequency selector 507, the three most significant digits of the divisor are hardwired to the counters conprising frequency selector 507. The two least significant digits of the divisor are preferably selectable by means of thumbwheel switches. In the example given above the digits "184" are hardwired, and the digits "70" are selectable. When this implementation of the programming of the divisor is employed, it is seen that the range of heterodyne frequencies is 9900 Hz.

With reference again to FIG. 2, IF filter circuitry 205 comprises two filters, designated IF 1 and IF 2. Filter IF 2 is designed to pass only those signals derived from the CW trigger signal which is transmitted by master station 100 (FIG. 1). It will be recalled that the trigger frequency is 60 Hz less than the normal transmit frequency in these type positioning systems. If the IF frequency is chosen to be 100,000 Hz, then filter IF 2 is designed to pass signals having frequencies in a narrow band with a center frequency of 100,060 Hz. As shown in FIG. 2, the output of filter IF 2 is coupled to the input of trigger processor 203.

Referring now to FIG. 6, the output of filter IF 2, indicated as IF 2 OUTPUT, is coupled to one input of NOR gate 600. Whenever the output of NOR gate 601 is a logic zero value, NOR gate 600 is enabled and the logical inverse of IF 2 OUTPUT appears at the output of NOR gate 600. The control of the logical level of the output of NOR gate 601 is accomplished in the following manner.

Suppose, for example, that a vessel is about to depart to sea for seismic exploration. It has a priori knowledge of its location when it starts. This knowledge permits the initial location of the vessel to be entered into the pattern digitizer circuitry. This location is usually visually displayed on the front panel of the pattern digitizer circuitry. It is this information which must be continuously updated during the ship's exploration operations in order that an accurate location of the ship may be maintained.

When the ship is ready to depart for sea, power is applied to the receiver/timing apparatus. At this time timing generator 201 will begin operation, and a TRIGGER GATE pulse of 100 millisecond duration will be generated once every second (or once every 1.3 seconds if three slaves are used in the positioning system). The TRIGGER GATE pulse emerging from timing generator 202 is coupled as an input to NOR gate 602. NOR gate 602 is preferably a 7402, but it will be observed by those skilled in the art that NOR gate 602 is connected to perform a logical inversion function. This being the case, an inverter, such as a 7404, may be substituted for NOR gate 602, and the same signal will appear at its output as does appear at the output of NOR gate 602.

It will be observed from the embodiment of timing generator 202 shown in FIG. 3 and from the timing diagram of FIG. 4 that the signal TRIGGER GATE normally has a logic one value. The active logic state of the TRIGGER GATE signal is, therefore, a logic zero, which results in the output of NOR gate 602 being active high when the TRIGGER GATE signal is active. The output of NOR gate 602 is coupled to one input of NOR gate 603, and when the TRIGGER GATE signal is active, the output of NOR gate 603 has a logic zero state. The output of NOR gate 603 is coupled to both inputs of NOR gate 604, and so the active state of the TRIGGER GATE signal causes the output of NOR gate 604 to assume a logic one state.

The output of NOR gate 604 is coupled to a differentiator comprised of capacitor 623 and resistor 624, and the connection 625 between capacitor 623 and resistor 624 is coupled to the input of NOR gate 605b. When the output of NOR gate 604 traverses from a low to a high logic state, a positive-going impulse (spike) appears at point 625, and this positive-going impulse sets flip-flop 605.

Still referring to FIG. 6, flip-flop 605 comprises cross-coupled NOR gates 605a and 605b. As indicated above with respect to the embodiment of timing generator 202 shown in FIG. 3, many devices may be used to implement flip-flop 605. When the output of NOR gate 604 assumes a logic one value during the active period of the trigger gate signal, the output of NOR gate 605b assumes a logic zero level, and the output of NOR gate 605a assumes a logic one level. The output of NOR gate 605a is coupled to the second input of NOR gate 601, and a logic one level at the output of NOR gate 605a insures that the output of NOR gate 601 remains low. This is true even after the signal TRIGGER GATE ceases to be active.

With reference still to FIG. 6, it will be observed by those skilled in the art that NOR gates 603 and 604 perform a logical OR function. This being the case, an OR gate, such as a 7432 which is manufactured by Texas Instruments, Inc. may be substituted for NOR gate 603 and 604, with the inputs to the OR gates being coupled to the same signals as the inputs of NOR gate 603 are coupled. Furthermore, it will be apparent to those skilled in the art that an OR function might be accomplished by utilizing a NAND gate whose output assumes logic one state whenever one of its inputs is a logic zero.

Since the output of NOR gate 601 is now low, NOR gate 600 is enabled, and when a signal emerges from the output of filter IF 2 of IF filter circuitry 205 (FIG. 2), its logical inverse appears at the output of NOR gate 600. The output of NOR gate 600 is coupled to the inputs of counter 606 and missing trigger frequency cycle detector 607.

The binary value of the outputs of counter 606 are modified by the signal appearing at the output of NOR gate 600. Since NOR gate 600 has been enabled, the presence of a signal at the output of filter IF 2 of filter circuitry 205 (FIG. 2) will appear in its logical inverse form at the output of NOR gate 600. This signal may be used to either increment or decrement the binary value of the outputs of counter 606.

In the preferred embodiment of trigger processor 203 of the receiver/timing apparatus of the present invention, the binary value of the outputs of counter 606 are initially set to all logical ones, and the binary value of the outputs is decremented by the occurence of pulses at the output of NOR gate 600.

In the preferred embodiment of trigger processor 203 of the receiver/timing apparatus of the present invention, counter 606 is twelve bits in length which means that 4,096 trigger pulses must occur before the binary value of the outputs of the counter are all zero. Counter 606 comprises three four-bit programmable binary counters, such as the 74193 which is manufactured by Texas Instruments, Inc., and the binary counters may be cascaded to provide a single counter twelve bits in length. The output of NOR gate 600 may then be coupled to the count down input of the first binary counter in the cascade. When all twelve bits of the twelve-bit counter are zero, the borrow output of the last counter in the cascade will be active during the next IF2 input.

It will be apparent to those skilled in the art that when a 74193 is utilized to implement counter 606, then the contents of the counter may be initially set to all zeros and that the binary value of the contents of the counter may be incremented by the occurrence of IF 2 pulses. This embodiment would require that the output of NOR gate 600 be coupled to the count up input of the first counter stage in the cascade. When 4,096 trigger pulses have been received, the outputs of the counter would be all logical ones, and the carry output of the third counter stage would be active on the next input.

Still referring to FIG. 6, missing trigger frequency cycle detector 607 is provided to insure that the frequency of the signal emerging from the output of NOR gate 600 approximates the esired IF 2 frequency (i.e., 100,060 Hz). If the frequency appearing at the output of NOR gate 600 is incorrect, it can be assumed with a great likelihood that spurious electrical transmissions have been received by the system. When missing trigger frequency cycle detector 607 detects a signal of improper frequency, its output, which is coupled to one input of NAND gate 609, becomes active low. This results in the output of NAND gate 609 becoming active high. The output of NAND gate 609 is coupled to both inputs of NAND gate 610, and a logic high on the both inputs of NAND gate 610 causes the output of NAND gate 610 to become active low. The output of NAND gate 610 is coupled to an input of counter 606, and if counter 606 comprises three cascade 74193's, the output of NAND gate 610 is coupled to each of the load inputs of those devices. A low on the load input will return the binary value of the outputs of counter 606 to all ones.

The preferred embodiment of missing trigger cycle detector 607 comprises a NE555 timer, such as manufactured by Signetics Corporation of Sunnyvale, California, and external circuitry to generate a signal at its output. The external circuitry is chosen such that a single triggering of the timer would produce a high logic level pulse of ten microseconds duration at its output. If the timer is retriggered before the expiration of ten microseconds, then the output will remain at a high logic level for another ten microseconds. Repetitive triggering by each high to low transition of the output of NOR gate 600 which occurs within ten microsecond intervals: (1) indicates that the IF signal derived from the trigger signal meets acceptable frequency criteria; and (2) keeps the output of the timer at a high logic level. If the output of NOR gate 600 does not trigger missing trigger frequency cycle detector 607 before ten microseconds, then the frequency of signal IF 2 is assumed to be incorrect. The output of missing trigger frequency cycle detector 607 goes to a low logic level, and counter 606 is reset via NAND gates 609 and 610.

Still referring to FIG. 6, it will be appreciated by those skilled in the art that NAND gate 609 and 610 implement a logical AND function. This being the case, NAND gates 609 and 610 could be replaced by one AND gate with the inputs to the AND gate coupled to the same signals to which the inputs of NAND gate 609 are coupled. The output of the AND gate would then be coupled to the load inputs of the counter 606. A suitable AND gate would be the 7408 such as manufactured by Texas Instruments, Inc.

It will further be appreciated that by those skilled in the art that NAND gate 610 performs a logical inversion function and that it may be replaced by an inverter which has its input coupled to the output of NAND gate 609 and has its outpt coupled to the inputs of counter 606. A suitable inverter which may be used to replace NAND gate 610 is the 7404, such as manufactured by Texas Instruments, Inc.

Still referring to FIG. 6, the preferred embodiment of trigger processor 203 also includes flip-flop 626, comprising cross-coupled NAND gates 626a and 626b. When the programmed contents of binary counter 607 have been decremented to zero, a pulse is generated by counter 606 on the next IF2 input. This pulse sets flip-flop 626, i.e., the output of NAND gate 626a traverses from a low to a high logic level.

At the end of the trigger signal transmission interval, the output of missing trigger frequency cycle detector 607 will assume a low logic level, because the trigger signal is no longer being transmitted. The output of NAND gate 610 assumes a low logic level at this time, thereby applying a reset signal to flip-flop 626. If flip-flop 626 has been set during the trigger interval, the output of NAND gate 626a traverses from a high logic level to a lower logic level when the reset is applied.

Still referring to FIG. 6, the preferred embodiment of trigger processor 203 also comprises integrator 650, which comprises capacitor 651, resistor 652, and diode 653, all connected as shown. The voltage at point 654 is normally a high logic level, and when the output of NAND gate 626a traverses from a high to a low logic level, the voltage at point 654 assumes a low logic level for a short period of time. The low logic level at point 654 activates trigger pulse generator 608.

From the foregoing discussion it is seen that the preferred embodiment of trigger processor 203 is designed such that trigger pulse generator 608 is not activated until the end of the trigger interval, if a suitable number of good trigger pulses have been received during the trigger interval. In the illustrated embodiment, 4,096 successive trigger pulses meeting acceptable frequency criteria must be received during a trigger interval in order for trigger pulse generator 608 to be activated at the end of the trigger interval. Since the frequency of the trigger signal used in the example was 100,060 Hz, approximately 40 milliseconds of the trigger signal must meet acceptable frequency criteria. If counter 606 is reset by missing trigger frequency cycle detector 607 during the reception of the trigger signal from the master, then 4,096 good trigger pulses must be received after the time of reset in order for trigger pulse generator 608 to be activated at the end of the trigger interval.

It will be appreciated by those skilled in the art that counter 606 may be modified so that a shorter or longer portion of the IF signal derived from the trigger frequency meets acceptable frequency criteria. If, for example, only 20 milliseconds of the IF 2 signal are required to meet acceptable frequency criteria, then the contents of counter 606 could be initially set to the binary equivalent 2047. On the other hand, an increase in counter length will enable longer portions of the trigger signal to meet acceptable frequency criteria.

It will be further appreciated by those skilled in the art that the illustrated preferred embodiment of counter 606 makes efficient use of medium-scale integration (MSI) devices. Conventional flip-flops could be used to implement counter 606, with the outputs of these flip-flops being decoded by a suitable decoder when a suitable number IF signals having acceptable frequency criteria have been received.

Still referring to FIG. 6, when trigger pulse generator 608 is activated, it produces a pulse at its output of a specific duration. Trigger pulse generator 608 preferably comprises a monostable multivibrator (one shot) or a timer. In the preferred embodiment of the invention, trigger pulse generator 608 comprises an NE 555 timer such as produced by Signetics Corporation of Sunnyvale, California. The output of trigger pulse generator 608 is coupled to both inputs of NAND gate 611 and to the reset input of flip-flop 605. When, therefore, the output of trigger pulse generator 608 is active, flip-flop 605 is reset and NOR gate 600 is disabled.

Still referring to FIG. 6, the outputs of NAND gate 611 are coupled to the inputs of counter 612, to the input of missing trigger pulse detector 613, to the second input to NAND gate 609, and to the first input of NOR gate 614. When, therefore, the output of NAND gate 611 is active (low), the binary value of the outputs of counter 606 are returned to its all ones state, counter 612 is incremented, missing trigger pulse detector 613 is activated, and a reset pulse is generated to timing generator 202 via NOR gate 614. The reset will be explained in more detail later.

The activation of missing trigger pulse detector 613 by the active state of the output of NAND gate 611 causes a pulse to appear at the output of missing trigger pulse detector 613. Missing trigger pulse detector 613 comprises an NE555 timer such as manufactured by Signetics Corporation of Sunnyvale, California. The active high output of missing trigger pulse detector 613 is applied as an input to integrator 615 and to the load input of counter 612.

The output of missing trigger pulse detector 613 first changes from a low to a high state when the first good trigger pulse is received. This reception is indicated by the output of NAND gate 611 going low, which activates missing trigger pulse detector 613. The duration of the active high output of missing trigger pulse detector 613 is preferably chosen 1.6 seconds, and, therefore, if another good trigger is received in the one second interval, then the second active low output of NAND gate 611 will cause the output of missing trigger pulse detector 613 to remain at a high level. In other words, as long as good trigger pulses are being received at one second intervals, the output of missng trigger pulse detector 613 will remain high.

The output of missing trigger pulse detector 613 is coupled to the input of integrator 615, which comprises resistors and capacitors. When the output of missing trigger pulse detector 613 has remained high for a sufficient length of time (i.e., good trigger pulses have been received for a sufficient number of successive transmission intervals) capacitor 615a in integrator 615 will become fully charged to a level of approximately five volts.

The output of capacitor 615a of integrator 615 is coupled to the input of buffer gate 616, and the output of buffer gate 616 is coupled to the input of inverter 617. The output of inverter 617 is coupled to the input of inverter 618, and the output of inverter 618 is coupled to the input of non-inverting buffer 619. The output of non-inverting buffer 619 is coupled to the second input of NOR gate 603. When capacitor 615a of integrator 615 is fully charged, the logical level of the signal appearing at the output of non-inverting buffer 619 will be a logical one which will inhibit NOR gate 603. The output of NOR gate 604 will traverse from a low to high logic level, and a positive-going impulse will appear at point 626. This positive-going impulse sets flip-flop 605. Since the output of non-inverting buffer 619 remains high as long as capacitor 615a remains fully charged, NOR gate 603 remains inhibited and the voltage at point 626 approaches zero volts at a rate dictated by the R-C time constant of resistor 624 and capacitor 623. Consequently, the output of NOR gate 605a (flip-flop 605) will remain low except when the output of trigger pulse generator 608 is active. When the active state of trigger pulse generator 608 ceases the output of NOR gate 605a will return to a logic low level. NOR gate 601 will, therefore, remain enabled after integrator 615 is fully charged, and signal IF 2 will only be enabled to counter 606 during the occurrence of TRIGGER GATE pulse.

Referring still to FIG. 6, as each good trigger pulse is detected, the outpt of NAND gate 611 assumes an active low state. This output is coupled as one input to NOR gate 614. Before integrator 615 became charged, the logic vale of the output of inverter 618, which is coupled to the second input of NOR gate 614, was low, thereby enabling NOR gate 614. The output of NOR gate 614 is coupled to one input of NOR gate 620. The active state of the output of NAND gate 611 at a time prior to capacitor 615a of integrator 615 becoming fully charged resulted in the output of NOR gate 614 traversing from a low to a high logic value. This high logic value on the input to NOR gate 615 caused the output of NOR gate 620 to go low. The output of NOR gate 620 is coupled to both inputs of NOR gate 621 and, therefore, the output of NOR gate 621 traversed from a low to a high logic value. This change in logical value activated reset timing 622.

When, however, capacitor 615a of integrator 615 becomes fully charged, the logic level of the output of inverter 618 is high and NOR gate 614 is disabled, thereby preventing the active state of the output of NAND gate 611 from initiating the reset timing 622.

Reset timing 622 is provided to generate a reset pulse to timing generator 202 in order that timing generator 202 may be maintained in synchronization with the received trigger pulses. Since the timing generator 202 comprises reliable solid state electronics it is reasonable to assume that frequent resetting of the timing generator 202 is not required.

It is, however, desirable to reset timing generator 202 after a preselected period of time has elapsed in order to insure that the synchronization is maintained. Programmable counter 612 is provided, therefore, to count the number of pulses emerging from trigger pulse generator 608. Each pulse emerging from trigger pulse generator 608 indicates that a good trigger signal has been received. When a sufficient number of good trigger signals, for example, 16 or 256, have been received, the borrow output of counter 612 will go low to its active state. The output of counter 612 is coupled to both inputs of NAND gate 625, and the active output of counter 612 causes the output of NAND gate 625 to traverse from a low to a high state. Since the output of NAND gate 625 is coupled to the second input of NOR gate 620, it is seen that the active high state will initiate the reset timing to generate a reset pulse to timing generator 202.

Timer 622 comprises either a monostable multivibrator (one shot) or a timer, and in the preferred embodiment of the invention reset timing 622 comprises an NE555 timer such as manufactured by Signetics Corporation of Sunnyvale, California. The resistor and capacitor circuitry associated with reset timing 622 is chosen such that the timer generates an output pulse which is ten microseconds in duration. The outpu pulse, RESET, of timer 622 is utilized by timing generator 202 to reset its counter circuitry (see FIG. 3). The information regarding the selection of components to vary the pulse width of an NE555 timer is shown in the Signetics Corporation Hand Book (1972).

Figure 7A:
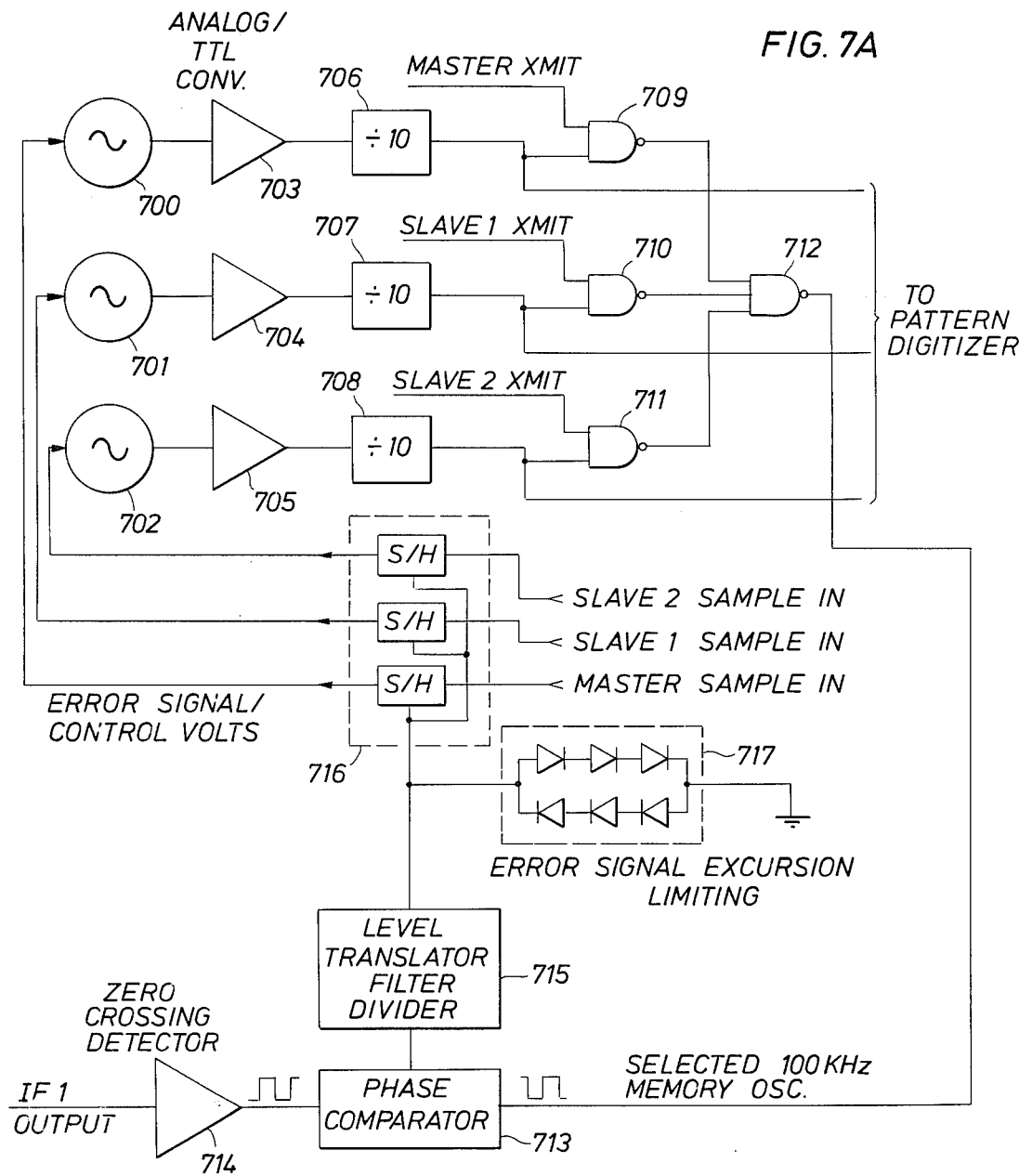
FIG. 7a is a logic diagram which illustrates an embodiment of the discriminator of FIG. 2.

With reference now to FIG. 7a, there is shown an embodiment of discriminator 206 which is utilized in the improved receiver/timing apparatus of the present invention. It comprises oscillators 700–702, each of which preferably have an oscillation frequency of 1 MHz. The output of oscillators 700–702 are coupled to the inputs of analog to TTL converters 703–705, respectively. Analog to TTL converter 703–705 are utilized to interface the signal level emerging from oscillator 700–702 to standard TTL voltage levels. The outputs of analog to TTL converter 703–705 are coupled to the inputs of counters 706–708, respectively. Counters 706-708 are preferably divide-by-ten counters, and since the output frequency of oscillators 700–702 is preferably 1 MHz, the frequency of the outputs of counters 706–708 is 100 KHz. Counters 706–708 may, for example, be 7490's, such as manufactured by Texas Instruments, Inc.

The signals emerging at the outputs of counters 706–708 are coupled to the inputs to the pattern digitizer (not shown), which is utilized to maintain the location of the vessel. The frequency of the signals at the outputs of counters 706–708 should be in phase with signal IF 1, which is derived from the mixing of the heterodyne frequency and the frequecy of the signal which is actually being received from the master and slave stations during the pattern frequency transmission times (see FIG. 1a).

In order that the signals emerging from the outputs of counters 706–708 be in phase with signal IF 1, additional circuitry is provided to correct the phase of oscillators 700–702 as required. In order to accomplish this, the outputs of counters 706–708 are coupled to first inputs of NAND gates 709–711. The second inputs to NAND gates 709–711 are coupled to the signals MASTER XMIT, SLAVE 1 XMIT, and SLAVE 2 XMIT, which are generated by the embodiment of the timing generator 202 which is shown in FIG. 3. NAND gates 709–711 are preferably 7400's such as manufactured by Texas Instruments, Inc.

The outputs of NAND gates 709–711 are coupled to the inputs of NAND gate 712. NAND gate 712. NAND gate 712 may, for example, be a 7410 such as maufactured by Texas Instruments, Inc.

The output of NAND gate 712 is coupled to one input of phase comparator 713. The other input to phase comparator 713 is coupled to the output of zero crossing detector 714, whose input is the signal IF 1. The output of phase comparator 713 is coupled to the input of level translator 715, and the output of level transistor 715 is coupled to the inputs of sample and hold circuitry 716 and to error signal excursion limiter 717. The various outputs of sample and hold circuitry 716 are coupled back to oscillator 700–702.

The embodiment of the discriminator shown in FIG. 7a functions as follows. During the time that the master station is transmitting its pattern frequency signal, the signal MASTER XMIT is active and enables NAND gate 709. The signal emerging from the output of counter 706 is enabled through NAND gate 709 and through NAND gate 712 to the first input of phase comparator 713. The phase of this signal is compared to the phase of signal IF 1 by phase comparator 713. If a difference in phase between the two signals is detected, then level translator 715 generates an error signal indicative of the phase difference.

The maximum excursion of the error signal is limited by error signal excursion limiter 717. Error signal excursion limiter 717 comprises a plurality of diodes 717a–717f, and it will be observed from the connection of the diodes that the error signal generated at the output of level translator 715 is clamped to approximately a plus or minus two volt error.

Figure 7B:
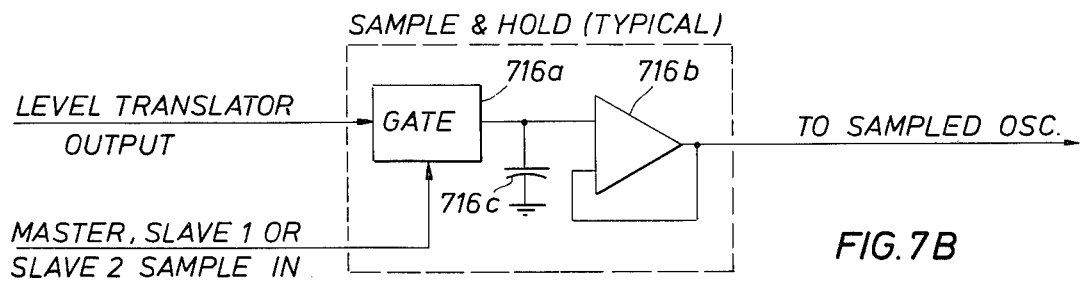

Sample and hold circuitry 716 comprises three circuits of the type shown in FIG. 7b. The output of level translator 715 is coupled to the input of gate 716a. The appropriate sample pulse is coupled to the other input of gate 716a, in the illustrated sample and hold circuit, the master sample signal is coupled to the enable input of gate 716A.

It will be recalled that the MASTER SAMPLE IN pulse is generated by the embodiment of timing generator 202 shown in FIG. 3, and reference may also be made to FIG. 4 to determine the relationship between the MASTER SAMPLE IN pulse and the MASTER XMIT pulse.

When the MASTER SAMPLE IN pulse is active, the level translator output is allowed to pass to the output of gate 716a, and the voltage level at capacitor 716c will change in response to the difference between the voltage level previously existing thereon and the voltage level at the level translator output. This voltage level at the output of capacitor 716c changes the voltages at the output of operational amplifier 716B which in turn adjusts the phase of the signal at the output of oscillator 700.

It should be apparent from the foregoing discussion that there are three sample and hold circuits such as illustrated in FIG. 7b in the embodiment of the discriminator shown in FIG. 7a. The first input to each gate of the sample and hold circuit is coupled to the level translator output and the enable input of each gate is coupled to the respective sample pulse, i.e., master, slave 1 or slave 2. It should be also apparent from the foregoing discussion that if three slave units were utilized, then an additional oscillator, analog to TTL converter, divide by ten counter, two input NAND gate, and an additional sample and hold circuit would be required to accommodate the addition of the third slave station. Furthermore, NAND gate 712 would be required to be a four input NAND gate such as a 7420 which is manufactured by Texas Instruments, Inc.

The foregoing description of the invention has been directed to a particular preferred embodiment in accordance with the requirements of the Patent Statutes and for purposes of explanation and illustration. It will be apparent, however, to those skilled in this art that many modifications and changes in both apparatus and method may be made without departing from the scope and spirit of the invention. Several of these modifications have been set forth in the preceding discussion. It is the applicant's intention in the following claims to cover all such equivalent modifications and variations as fall within the true spirit and scope of the invention.

What is claimed is:

1. In a single frequency, time-shared, phase-comparison positioning system wherein a continuous wave trigger signal is transmitted from a master station, wherein continuous wave pattern frequency signals for phase-comparison are then transmitted in fixed sequence from first the master station and then a plurality of slave stations, and wherein the trigger and pattern frequency signals are transmitted for fixed intervals and at a fixed repetition rate, an improved receiver/timing apparatus for preventing the phase-comparison process from being affected by false triggering, which comprises:

timing means for generating a first set of sequentially active signals which correspond in sequence and active duration to the trigger and pattern frequency sequence and transmission intervals, respectively, and which have a repetition rate which is identical to the repetition rate of the transmitted trigger and pattern frequency intervals;

means for receiving the transmitted continuous wave signals;

means in association with said receiving means for deriving an IF signal from the received trigger signal; and a trigger processor which determines if a predetermined continuous portion of the derived IF signal meets acceptable frequency criteria and which resets the timing means to a state corresponding to the beginning of the pattern frequency transmission intervals if the predetermined continuous portion of the derived IF signal meets acceptable frequency criteria.

2. The improved receiver/timing apparatus of claim 1 wherein the trigger processor comprises:
   a programmable counter, whose contents are initially set to a predetermined programmed value, for generating one signal per trigger transmission interval after a number of pulses of the derived IF signal equal to the predetermined programmed value of the counter have been counted;
   means for checking the pulse width of each pulse of the derived IF signal to determine if the derived IF signal meets acceptable frequency criteria;
   means for restoring the contents of the counter to the predetermined programmed value whenever a pulse of the derived IF signal does not meet acceptable frequency criteria;
   a trigger pulse generator responsive to the signal generated by the counter for generating a signal at its output at the end of the trigger interval if the predetermined portion of the derived IF signal meets acceptable frequency criteria; and
   reset timing means responsive to the output of the trigger pulse generator for generating a signal at its output to reset the timing means to a state corresponding to the beginning of the pattern frequency transmission interval.

3. The improved receiver/timing apparatus of claim 2, wherein the reset timing means comprises:
   a missing trigger pulse detector which is responsive to the signal generated by the trigger pulse generator for generating a signal having a pulse width greater than the period of time between two successive trigger intervals;
   an integrator including a resistor ad a capacitor, said integrator being responsive to the signal at the output of the missing trigger pulse detector for charging the capacitor; and
   means for inhibiting the output of the trigger pulse geneator from activating the reset timing means when the capacitor in the integrator is fully charged.

4. The improved receiver/timing apparatus of claim 1, wherein the trigger processor additionally comprises:
   means for detecting when trigger signals meeting acceptable frequency criteria have been received for a predetermined number of successive trigger intevals; and
   inhibiting means responsive to the detection means for preventing the signal generated by the trigger pulse generator from resetting the timing means.

5. The improved receiver/timing apparatus of claim 2, wherein it additionally comprises:
   a second programmable counter for counting the pulses generated by the trigger pulse generator and for generating a pulse when trigger signals meeting acceptable frequency criteria have been received for a second predetermined number of trigger transmission intervals; and
   means responsive to the signal generated by the second programmable counter for activating the reset timing means to reset the timing circuitry to a state corresponding to the beginning of the pattern frequency transmission intervals.

6. The improved receiver/timing apparatus of claim 1, wherein it additionally comprises:
   means for deriving a second IF signal from the pattern frequency signals transmitted by the master and slave stations;
   timing means for generating a set of sequentially active sample signals, wherein the set of sample signals are active during respective portions of the pattern frequency transmission intervals;
   means for generating a plurality of signals for use by a pattern digitizer; and
   a discriminator responsive to the first and sample sets of signals generated by the timing means for comparing the phase relationship of the second IF signal to the respective pattern digitizer signal and for adjusting the phase of the respective pattern digitizer signal to be in phase with the received second IF signal.

7. The improved receiver/timing apparatus of claim 6, wherein the adjustment means of the discriminator comprises:
   error excursion limiting means for limiting the amount of phase adjustment which may be made to each pattern digitizer signal during a pattern frequency transmission interval.

8. In a single frequency time-shared, phase-comparison positioning system wherein a continuous wave trigger signal is transmitted from a master station, wherein continuous wave pattern frequency signals for phase-comparison are then transmitted in fixed sequence from first the master station and then a plurality of slave stations, and wherein the trigger and pattern frequency signals are transmitted for fixed intervals and at a fixed repetition rate, an improved receiver/timing apparatus for preventing the phase-comparison process from being affected by false triggering, which comprises:
   timing means for generating two sets of signals, the signals of the first set being sequentially active in sequence and active duration corresponding to the trigger and pattern frequency sequence and transmission intervals, respectively, having a repetition rate which is identical to the repetition rate of the transmitted trigger and pattern frequency transmission interval with which is corresponds, and the second set of signals being sequentially active sample signals which are active during respective portions of the pattern frequency transmission intervals;
   means for receiving the transmitted continuous wave signals;
   means in association with said receiving means for deriving a first IF signal from the received trigger signal and a second IF signal from the received pattern frequency signals;
   a programmable counter, whose contents are intially set to a predetermined programmed value, which is utilized to generate a signal during a transmission interval after a number of pulses of the first IF signal equal to the programmed contents of the counter have been counted;
   means for checking the width of each pulse of the first IF signal;
   means for restoring the contents of the counter to its initial programmed value whenever the pulse width of the first IF signal does not meet acceptable frequency criteria;
   a trigger pulse generator responsive to the signal generated by the counter for generating a signal at its output at the end of the trigger interval if the predetermined portion of the first IF signal meets acceptable frequency criteria;
   a missing trigger pulse detector which is responsive to the signal generated by the trigger pulse generator for generating a signal having a pulse width greater than the period of time between two successive trigger intervals;

an integrator including a resistor and a capacitor, said integrator being responsive to the signal at the output of the missing trigger pulse detector for charging the capacitor;

reset timing means responsive to the output of the trigger pulse generator for generating a signal at its output to reset the timing means to a state corresponding to the beginning of the pattern frequency transmission interval;

means for inhibiting the output of the trigger pulse generator from activating the reset timing means when the capacitor in the integrator is fully charged;

means for generating a plurality of pattern digitizer signals;

a discriminator responsive to the first and sample sets of signals generated by the timing means and responsive to the second IF signal for comparing the phase relationship of the second IF signal to the respective pattern digitizer signal which is generated; and means for adjusting the phase of the respective pattern digitizer signal, said adjustment means including error excursion limiting means for limiting the amount of phase adjustment which may be made to each pattern digitizer signal during a pattern frequency transmission interval.

9. The improved receiver/timing apparatus of claim 8, wherein it additionally comprises:

a second programmable counter for counting the pulses generated by the trigger pulse generator and for generating a pulse when trigger signals meeting acceptable frequency criteria have been received for a second predetermined number of trigger transmission intervals; and means responsive to the signal generated by the second programmable counter for activating the reset timing means to reset the timing circuitry to a state corresponding to the beginning of the pattern frequency transmission intervals.

* * * * *

UNITED STATES PATENT OFFICE
CERTIFICATE OF CORRECTION

Patent No. 4063244                    Dated December 13, 1977

Inventor(s) Franz Van de Kop

It is certified that error appears in the above-identified patent and that said Letters Patent are hereby corrected as shown below:

Col. 4, line 29, "described." should read --described,--.

Col. 5, line 63, "signals from" should read --signals emerging from--.

Col. 10, line 4, "inut" should read --input--.

Col. 16, line 43, "oupu" should read --output--.

Col. 12, line 56, "esired" should read --desired--.

Col. 17, line 22, "maufac-" should read --manufac- --.

Col. 19, line 39, "geneator" should read --generator--.

Col. 19, line 47, "intevals" should read --intervals--.

Col. 19, line 34, "ad" should read --and--.

Col. 20, line 39, "is" should read --it--.

Signed and Sealed this

Twenty-fifth Day of July 1978

[SEAL]

Attest:

RUTH C. MASON
Attesting Officer

DONALD W. BANNER
Commissioner of Patents and Trademarks